US005344200A

United States Patent [19]

Yoshioka

[11] Patent Number: 5,344,200

[45] Date of Patent: Sep. 6, 1994

[54] IMPLEMENT FOR DISPOSING OF DUNG OF A PET ANIMAL

[75] Inventor: Mashayuki Yoshioka, Kanagawa, Japan

[73] Assignee: Olive Corporation, Tokyo, Japan

[21] Appl. No.: 915,106

[22] Filed: Jul. 16, 1992

[30] Foreign Application Priority Data

Apr. 27, 1992 [JP] Japan .................................. 4-136276

[51] Int. Cl.[5] .......................... A01K 29/00; E01H 1/12

[52] U.S. Cl. ...................................................... 294/1.5

[58] Field of Search .................................. 294/1.3–1.5, 294/19.1, 55, 115; 15/104.8, 257.1, 257.6, 257.7; 119/161; 135/66; 248/95, 99, 101

[56] References Cited

U.S. PATENT DOCUMENTS 4,717,186 1/1988 Yoshioka .............................. 294/1.5

4,878,703 11/1989 Yoshioka .............................. 294/1.5

*Primary Examiner*—Johnny D. Cherry

*Attorney, Agent, or Firm*—Dann, Dorfman, Herrell and Skillman

[57] ABSTRACT

An implement for disposing of dung of a pet animal adapted to be pointed to a rump of a pet animal by a user to receive dung of the pet animal through a sack, comprises an elongated tubular body having first and second ends, a housing body mounted on an upper wall of the elongated tubular body for carrying vertically stacked cartridges therein, each of the cartridges including a pair of casing members hingedly connected at one ends thereof to each other and a sack supported between the casing members in a manner to be folded up, a pair of receiving members inserted in a longitudinal bore of the tubular body for receiving a lowermost one of tile cartridges when the lowermost cartridge drops down from the housing body toward the bore of the tubular body by gravity, a rod-like pusher movably inserted in the bore of the tubular body for pushing toward the first end of the tubular body the lowermost cartridge received by the receiving members, the receiving members pivotally connected at one ends thereof to the pusher, between which receiving members a spring is stretched, thereby always urging the receiving members to be opened away from each other, and cooperating members on the receiving members and the casing members of each of the cartridges for causing the casing members to be separately held on the receiving members when each of the cartridges is received by the receiving members.

28 Claims, 11 Drawing Sheets

500b
50
205
500
20
200
607
500a
502
605(604)
609a(608a)
601(600)
60
407(406)
204
203
40
301
304a
306
300
304
702
70
701
700
302
303a
703
305
303

30
300
301
607
200
20
504
50
505
500b
204
500a
208
207
206
209
502
605(604)
601(600)
60

306
403
304
502a(502b)
304a
604
605
300
402
30
20
400
401
40
410
303a
407a
610
611
303
407
406
305
406b
406a
407b 91
202'
20'
805
801
804
30
70
701
700
300
200'
609a
601
609
611
603
90
201'
60
600
608a
602
608
610

91
202'
523
524
20'
50'
500'
204'
802
522
502
300
30
803
605(604)
601(600)
609a(608a)
301
40
40
60
203
211
90
201'

IMPLEMENT FOR DISPOSING OF DUNG OF A PET ANIMAL

BACKGROUND OF THE INVENTION

1. Field of the Invention

This invention relates to an improvement of an implement for disposing of dung of a pet animal such as a dog or the like, and more particularly to a dung disposing implement which is adapted to be pointed to a rump of a pet animal by a user, when the pet animal acts as if it was ready to excrete dung, to receive dung excreted from it.

2. Description of the Prior Art

This kind of dung disposing implement is disclosed in U.S. Pat. Nos. 4,717,186 and 4,878,703 to Mashayuki Yoshioka who is the inventor of the present invention. In each of the dung disposing implements disclosed in these patents, there is employed a cartridge which generally includes a pair of casing members pivotally connected at one ends thereof to each other, and a vinyl sack having an opening for receiving dung of a pet animal and a resilient wire provided along a margin of the opening of the vinyl sack, the vinyl sack being supported through the resilient wire between the casing members in a manner to be folded When the cartridge is pushed out of a tip end of an elongated tubular member of each of the conventional dung disposing implements by pushing means, the casing members of the cartridge are opened away from each other due to an elastic force of the resilient wire of the cartridge whereby the vinyl sack having been folded up between the casing members is simultaneously spread, resulting in the opening of the vinyl sack being completely opened. In state where the opening of the vinyl sack is completely opened, a user points the elongated tubular member to a pet animal so as to cause the opened vinyl sack to be held to a rump of the pet animal, whereby the vinyl sack can receive dung excreted from the pet animal. After the cartridge receives dung of the pet animal through the spread vinyl sack thereof, the cartridge is disposed of as waste. Generally speaking, this kind of waste is incinerated.

In each of the conventional dung disposing implements, when the cartridge is pushed out of the tip end of the elongated tubular member by the pushing means, the vinyl sack of the cartridge is adapted to be spread with resort to the elastic force of the resilient wire provided along the margin of the opening of the vinyl sack. Therefore, the resilient wire is indispensable for causing the vinyl sack to be spread. When the cartridge, after receiving dung of a pet animal through the vinyl sack, is incinerated, the resilient wire will remain unburned, since the resilient wire is nonflammable. Therefore, the cartridge including the resilient wire which is nonflammable is undesirable. In addition, the cartridge includes the resilient wire as an indispensable part thereof, so that the cartridge is complex in construction and high in cost. It is desirable that the cartridge which is to be disposed of as waste can be manufactured simply and at a low cost.

SUMMARY OF THE INVENTION

The present invention has been made with a view to overcoming the foregoing problems of the prior art implements.

It is therefore an object of the present invention to provide an implement for disposing of dung of a pet animal, wherein spreading of a sack for receiving dung of the pet animal is made possible without resort to such a resilient wire as a cartridge which each of the prior art implements has.

It is another object of this invention to provide a dung disposing implement as stated above, wherein a cartridge which is simpler in construction and lower in cost can be employed.

Generally speaking, in accordance with the present invention, an implement for disposing of dung of a pet animal is provided which comprises tubular means comprising an elongated tubular body having first and second ends; storage means mounted on an upper wall of the elongated tubular body for carrying vertically stacked cartridges therein, each of the cartridges including a pair of casing members hingedly connected at one ends thereof to each other and sack means having an opening for receiving dung of the pet animal, the sack means supported between the casing members in a manner to be folded up; cartridge receiving means inserted in a longitudinal bore of the tubular body for receiving a lowermost one of the cartridges vertically stacked within the storage means, when the lowermost cartridge drops down from the storage means toward the bore of the tubular body by gravity; pusher means movably inserted in the bore of the tubular body for pushing toward the first end of the tubular body the lowermost cartridge received by the receiving means, the receiving means including a pair of cartridge receiving members pivotally connected at one ends thereof to the pusher means and spring means provided between the cartridge receiving members to always urge the receiving members to be opened away from each other; and cooperating means on the cartridge receiving members and the casing members of each of the cartridges for causing one of the casing members to be held on one of the cartridge receiving members and causing the other of the casing members to be held on the other of the cartridge receiving members when each of the cartridges is received by the cartridge receiving means.

In a preferred embodiment of the present invention, the dung disposing implement further comprises locking means for locking the pusher means with respect to the tubular means to cause the cartridge receiving means to be stationarily located at a position just below the storage means.

In a preferred embodiment of the present invention, the dung disposing implement further comprises actuating means for automatically moving the pusher means toward the first end of the tubular body and automatically returning the pusher means toward the second end of the tubular body.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENTS

An implement for disposing of dung of a pet animal according to the present invention generally includes tubular means, storage means mounted with respect to the tubular means for carrying vertically stacked cartridges therein, pusher means movably inserted in the tubular means, and cartridge receiving means pivotally connected to the pusher means for receiving a lowermost one of the cartridges vertically stacked within the storage means.

Figure 1:
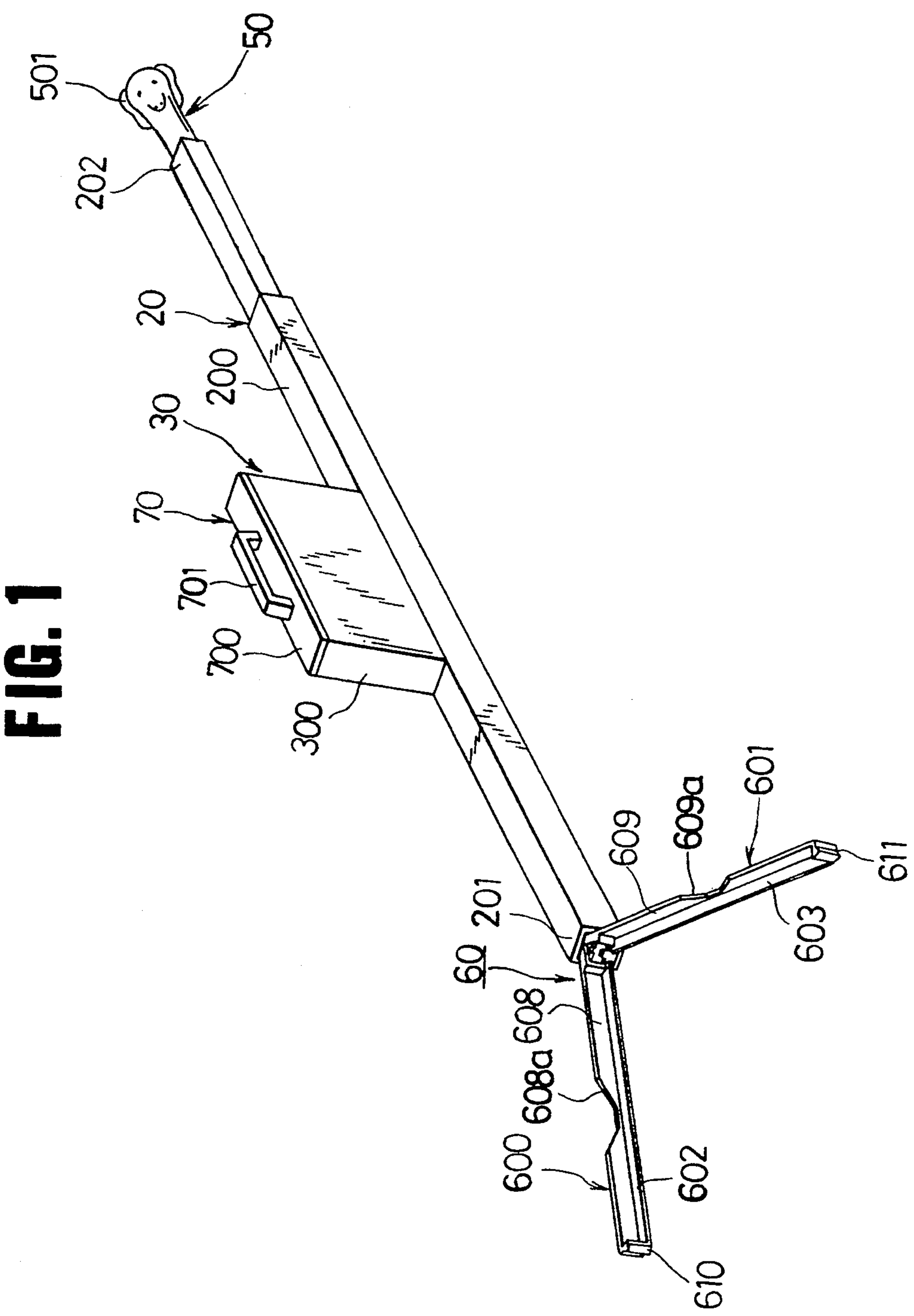
FIG. 1 is a schematic perspective view of an implement for disposing of dung of a pet animal according to a first embodiment of the present invention, in which cartridge receiving members of cartridge receiving means are projected out of a first end of a tubular body and opened away from each other due to an action of a spring stretched between the cartridge receiving members.
Figure 2:
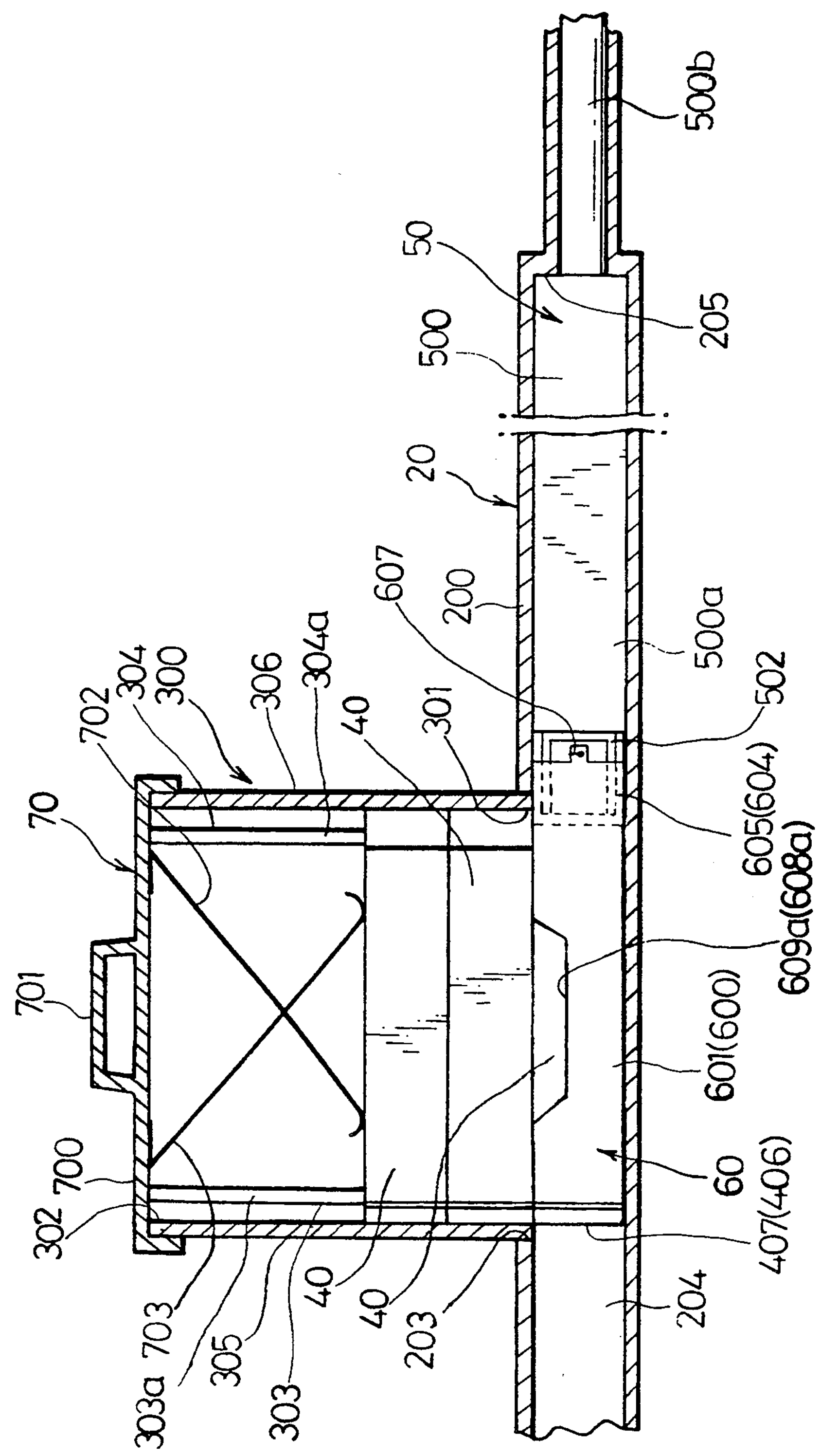
FIG. 2 is a segmentary sectional view of the dung disposing implement according to the first embodiment.

Referring to FIGS. 1 and 2, there is illustrated an implement for disposing of dung of a pet animal according to a first embodiment of the present invention.

The tubular means 20 comprises an elongated tubular body 200 which is made of lightweight material such as plastic or the like and has a first end 201 and a second end 202. As shown in FIG. 2, the tubular body 200 further has an opening 203 formed in a predetermined portion of an upper wall thereof.

The storage means 30 comprises a generally box-like housing body 300 which is made of lightweight material such as plastic or the like and has a lower opening 301 and an upper opening 302. The housing body 300 is removably mounted with respect to the tubular body 200 by causing a lower portion of the housing body 300 to be fitted in the opening 203 of the tubular body 200. The housing body 300 may be formed integrally with the tubular body 200. As briefly described above, the housing body 800 is adapted to carry vertically stacked-cartridges 40 therein. The upper opening portion 802 of the housing body 300 is covered by cover means 70. The cover means 70 comprises a substantially plate-like body 700, a handle 701 integrally provided on a top surface of the substantially plate-like body 700, and first and second leaf springs 702 and 703 which are provided on an under surface of the substantially plate-like body 700. The plate-like body 700 is made of lightweight material such as plastic or the like, while each of the first and second leaf springs 702 and 703 is made of a stainless steel sheet.

Figure 3:
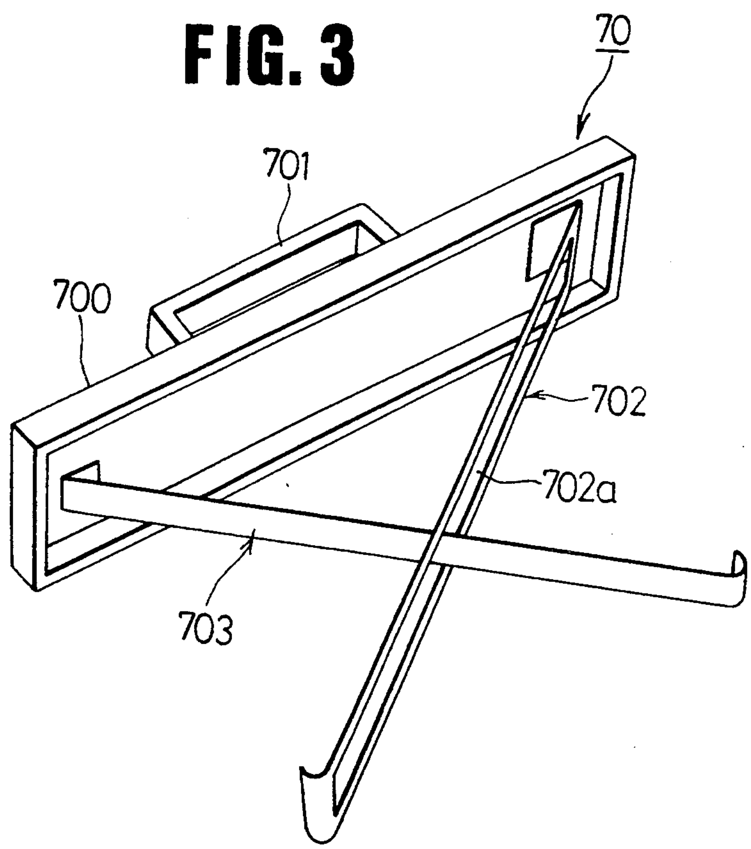
FIG. 3 is an enlarged perspective view of cover means for covering storage means.

Referring now to FIG. 3, the first leaf spring 702 has an elongated through-hole 702*a* formed by punching a substantially central portion of the first leaf spring 702 and is attached at one end portion thereof to one end portion of the plate-like body 700. The second leaf spring 703 is also attached at one end portion thereof to the other end portion of the plate-like body 700. The first leaf spring 702 and the second leaf spring 703 cross each other by causing a free end of the second leaf spring 703 to be inserted through the elongated through-hole 702*a* of the first leaf spring 702. When the upper opening portion 302 of the housing body 300 is covered by the cover means 70 constructed as described above, the cartridges 40 housed within the housing body 300 are urged toward a longitudinal bore 204 of the tubular body 200 due to actions of-the first and second leaf springs 702 and 703.

Figure 4:
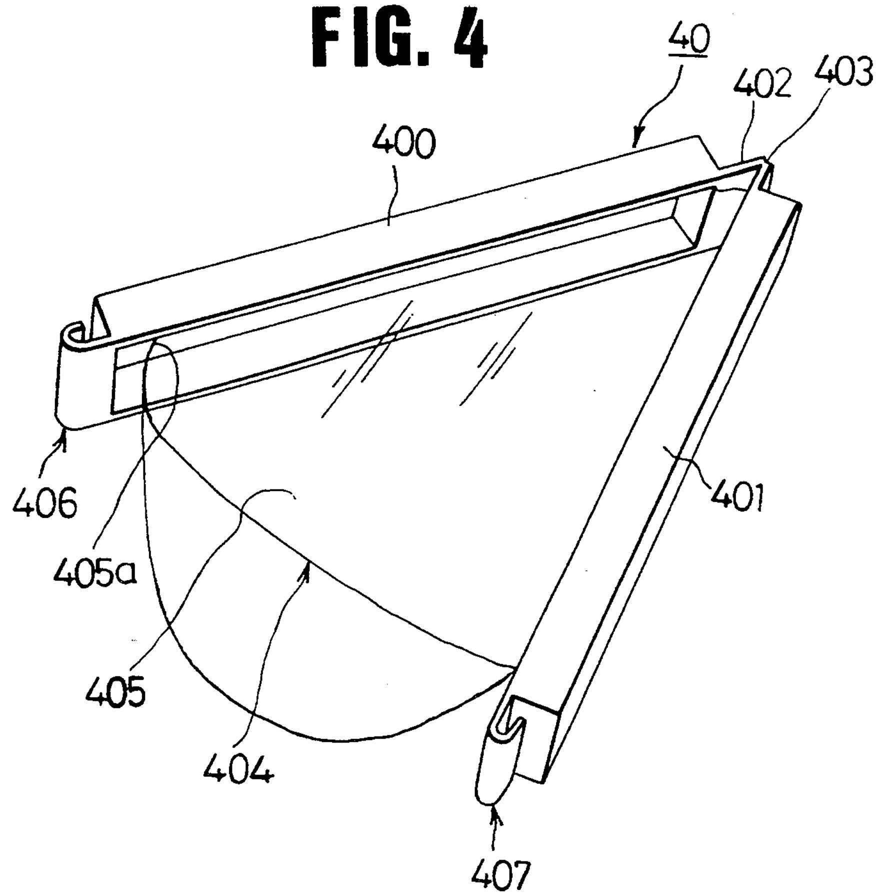
FIG. 4 is an enlarged perspective view of a cartridge, in which a pair of casing members are opened away from each other.

Referring to FIG. 4, each of the cartridges 40 housed within the storage means 30 comprises a pair of casing members 400 and 401, each including a substantially box-like body having a substantially U-like configuration in vertical section. The casing members 400 and 401 are hingedly connected at one ends thereof to each other in a manner to be faced to each other at opened sides thereof. More particularly, the casing members 400 and 401 are formed of plastic material, heavy paper or the like, and integrally interconnected at faced edges of the one ends thereof through an intermediate section 402. The intermediate section 402 is formed with a fold line 403 extending vertically at substantially the midpoint along a width direction of the intermediate section 402. The fold line 403 acts as a hinge between the casing members 400 and 401 and enables the casing members 400 and 401 to be pivoted about the fold line 403. Contained between the faced sides of the casing members 400 and 401 is a sack 404 having an opening 405 formed at a top portion thereof for receiving dung of a pet animal. The sack 404 is contained between the casing members 400 and 401 in a manner to be folded up. A part 405*a* of a margin of the opening 405 is attached onto inner surfaces of the casing members 400 and 401. The sack 404 may be formed of paper, polyvinyl chloride resin, cellophane or the like. When the sack 404 is formed of polyvinyl chloride resin, it may be attached to the casing members 400 and 401 by, for example, vacuum evaporating. The cartridge 40 constructed as described above is housed within the storage means 30 with the casing members 400 and 401, between which the sack 404 is contained, being closed toward each other.

The pusher means 50 comprises a substantially rod-like body 500 which is movably inserted in the longitudinal bore 204 of the tubular body 200. As shown in FIG. 2, the rod-like body 500 has a large diameter portion **500*a* and a small diameter portion 500*b*. The small diameter portion 500*b* of the rod-like body 500 is projected at a rear end portion thereof out of the second end 202 of the tubular body 200 which is blocked up, and integrally or removably provided at the rear end portion of the small diameter portion 500*b* with a grip 501 as shown in FIG. 1. The grip 501 may be formed into, for example, a dog-faced shape and pigmented whereby decorative features can be offered. A tip end of the large diameter portion 500*a* of the rod-like body 500 is provided with the cartridge receiving means 60**.

The cartridge receiving means 60 comprises a pair of cartridge receiving members 600 and 601, each having a substantially L-like configuration in vertical section. The cartridge receiving members 600 and 601 are pivotally connected at one ends thereof to the tip end of the large diameter portion **500*a* of the rod-like body with horizontal portions 602 and 603** thereof being faced to each other.

Figure 5:
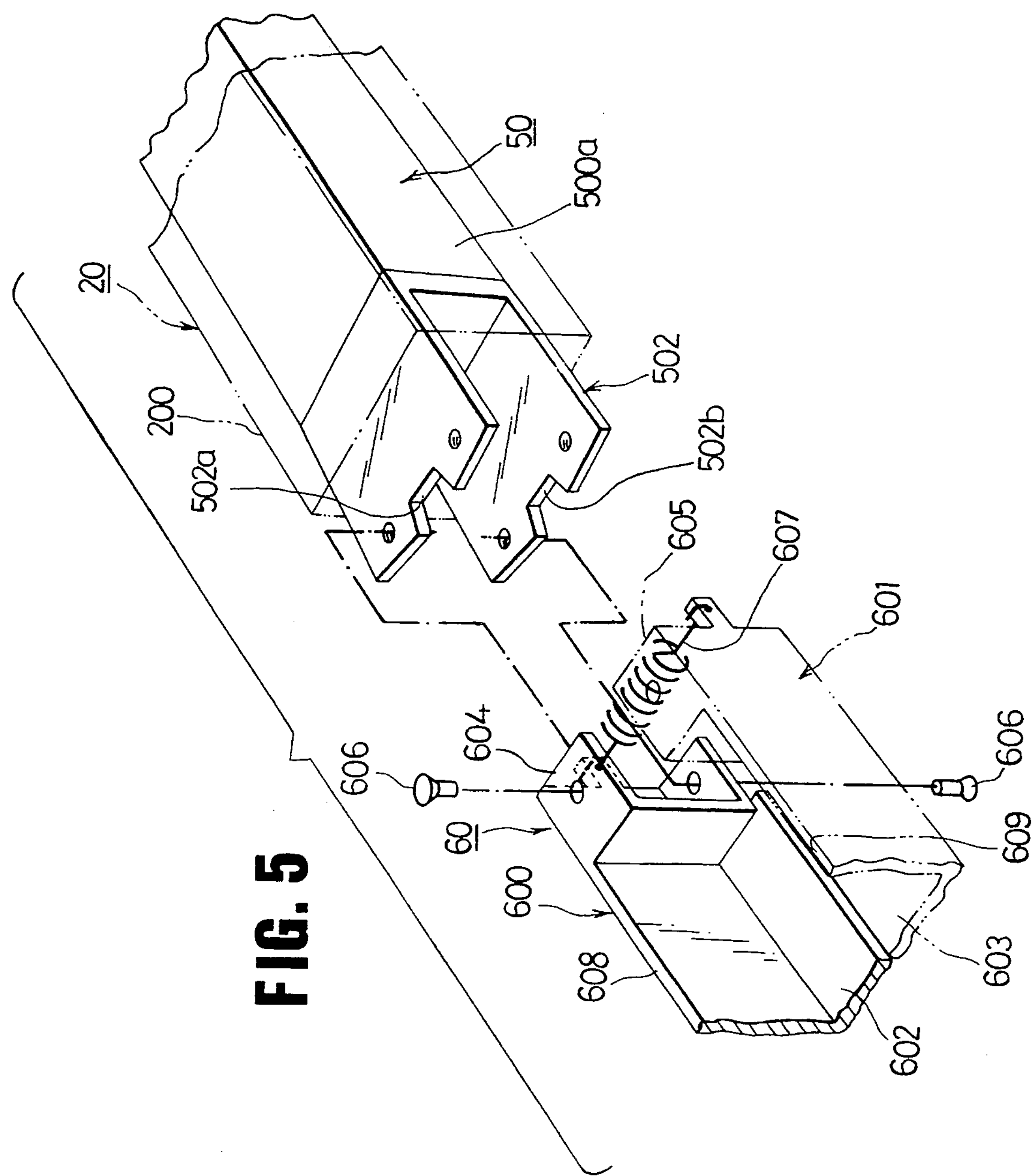
FIG. 5 is an enlarged exploded perspective view of the cartridge receiving members and pusher means.

Referring now to FIG. 5, the receiving members 600 and 601 respectively have root portions 604 and 605 integrally formed at one ends thereof, each of which root portions 604 and 605 has a substantially U-shape in vertical section. The rod-like body 500 of the pusher means 50 has a bracket 502 of a substantially U-shape in vertical section, which bracket 502 is integrally formed at the tip end of the large diameter portion **500*a*. The U-shaped bracket 502 is formed with notches 502*a* and 502*b* at upper and lower horizontal portions thereof. The notches 502*a* and 502*b* are formed in a manner to be aligned with each other. The cartridge receiving members 600 and 601 are pivotally connected through the bracket 502 to the tip end of the large diameter portion 500*a* of the rod-like body 500 by fitting the root portions 604 and 605 of the cartridge receiving members 600 and 601 on the bracket 502 and causing the root portions 604 and 605 to be supported to the bracket 502 by means of pins 606. Also, the cartridge receiving members 600 and 601 are pivotally connected to the large diameter portion 500*a* of the rod-like body 500 with the root portions 604 and 605 thereof being spaced apart from each other at an interval slightly wider than a width of each of the notches 502*a* and 502*b* of the bracket 502. Stretched between the root portions 604 and 605 of the cartridge receiving members 600 and 601 is a spring 607. The spring 607 always urges the cartridge receiving members 600 and 601** to be opened away from each other.

In a state shown in FIG. 1, when a user grasps the grip 501 and draws the rod-like body 500 of the pusher means 50 toward the second end 202 of the tubular body 200, the cartridge receiving members 600 and 601 are retracted into the longitudinal bore 204 of the tubular body 200 while being closed toward each other against an action of the spring 607. When the rod-like body 500 of the pusher means 50 is further drawn toward the second end 202 of the tubular body 200, the receiving members 600 and 601 arrive at a position just below the lower opening 301 of the housing body 300 and come to be aligned with the lower opening 301 of the housing body 300 as shown in FIG. 2. At this time, a lowermost one of the cartridges 40 vertically stacked within the housing body 300 will fall down into a space between vertical portions 608 and 609 of the receiving members 600 and 601 by gravity. In order to ensure the falling of the lowermost cartridge 40 into the space between the vertical portions 608 and 609 of the receiving members 600 and 601, there may be employed locking means for locking the rod-like body 500 of the pusher means 50 with respect to the tubular body 200 even as the cartridge receiving members 600 and 601 arrive at the position just below the lower opening 301 of the housing body 300 and come to be aligned with the lower opening 301 of the housing body 300.

As one example of the locking means, there may be employed locking means shown in FIG. 2. The locking means includes a circumferential step portion 205 formed around a predetermined portion of an inner surface of the tubular body 200. Even as the rod-like body 500 is drawn toward the second end 202 of the tubular body 200 by a user and engaged with the circumferential step portion 205 of the tubular body 200 at a rear end of the large diameter portion **500*a*, the cartridge receiving members 600 and 601 are locked with respect to the tubular body 200 and stationarily located at the position just below the lower opening 301 of the housing body 300 in a manner to be aligned with the lower opening 301 of the housing body 300. The forming position of the circumferential step portion 205 and a length of the large diameter portion 500*a* of the rod-like body 500 are set in a manner to allow the cartridge receiving members 600 and 601 to be stationarily located at the position just below the lower opening 301 of the housing body 300 even as the large diameter portion 500*a* of the rod-like body 500 is engaged with the circumferential step portion 205 of the tubular body 200**.

Incidentally, the cartridges 40 housed within the housing body 300 are supported on a top surface of the large diameter portion **500*a* of the rod-like body 500 until the cartridge receiving members 600 and 601 arrive at the position just below the lower opening 301 of the housing body 300. Therefore, before the cartridge receiving members 600 and 601 arrive at the position just below the lower opening 301 of the housing body 300, a lower most one of the cartridges 40 does not fall to the longitudinal bore 204 of the tubular body 200**.

Figure 6:
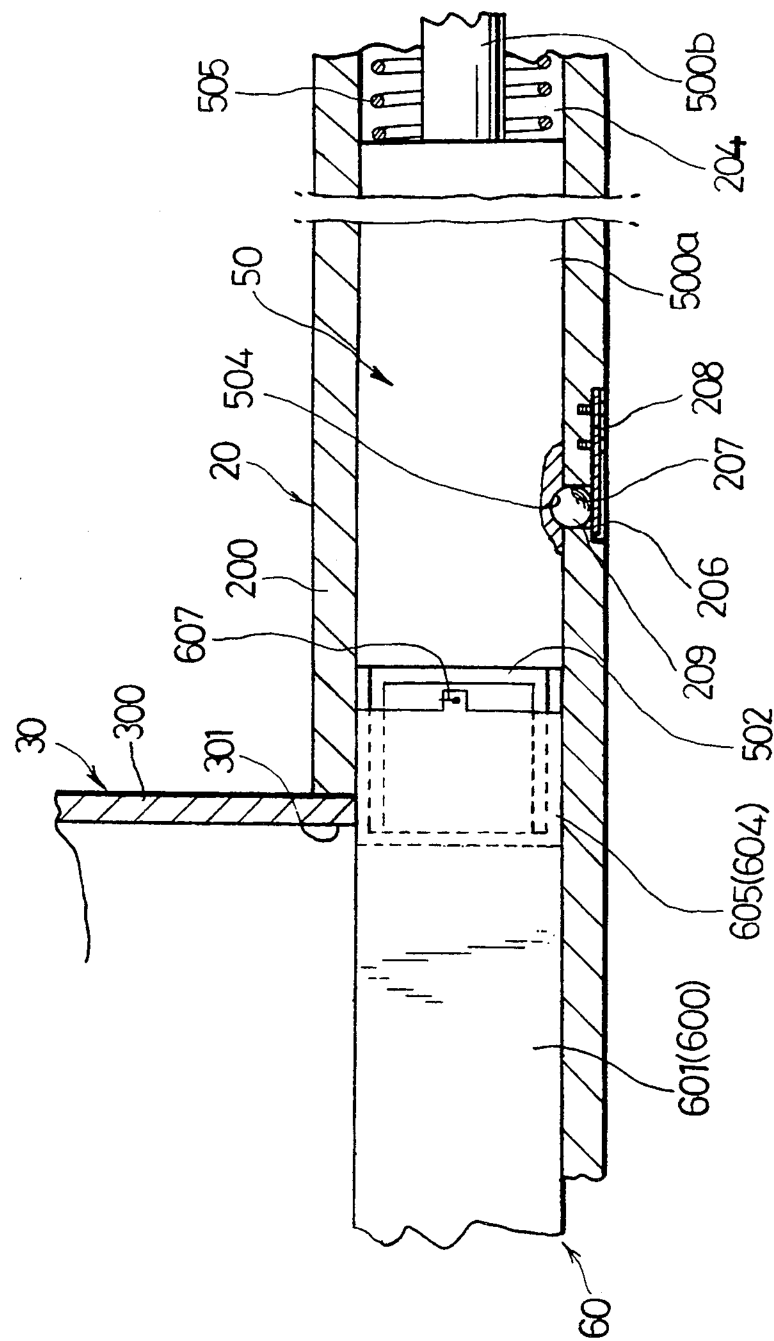
FIG. 6 is an enlarged segmentary sectional view of the dung disposing implement according to the first embodiment, in which one example of locking means for locking the pusher means with respect to the tubular body is shown.

In place of the locking means shown in FIG. 2, locking means shown in FIG. 6 may be employed. Referring to FIG. 6, the locking means comprises a recess 206 formed in a predetermined portion of a lower wall of the tubular body 200 in a manner such that an opened side of the recess 206 is faced downwardly, a through-hole 207 communicating between the recess 206 and the longitudinal bore 204 of the tubular body 200, a leaf spring 208 received in the recess 206 with one end portion thereof being seated against an upper surface of the recess 206, a ball 209 rollably supported on an upper surface of a free end of the leaf spring 208, and a concavity 504 of a hemispheric shape formed in a predetermined portion of an under surface of the large diameter portion **500*a* of the rod-like body 500. The ball 209 is movably fitted in the through-hole 207 and normally projected slightly in the longitudinal bore 204 of the tubular body 200 due to an action of the leaf spring 208. A part of the ball 209 which projects in the longitudinal bore 204 of the tubular body 200 is adapted to be engaged with the concavity 504 of the rod-like body 500. Such engagement of the ball 209 with the concavity 504 of the rod-like body 500 allows the rod-like body 500 to be locked with respect to the tubular body 200. Simultaneously with the engagement of the ball 209 with the concavity 504 of the rod-like body 500, the cartridge receiving members 600 and 601 are adapted to be stationarily located at the position just below the lower opening 301 of the housing body 300. More particularly, when a user pulls the grip 501 backward, the rod-like body 500 is moved towards the second end 202 of the tubular body 200 to be abutted against the ball 209 at the large diameter portion 500***a* thereof. Further pulling of the rod-like body 500 allows the large diameter portion 500*a* of the rod-like body 500 to be ridden on the ball 209 while depressing the ball 209 through the lower surface thereof against the action of the leaf spring 208 to cause the ball 209 to be retracted from the longitudinal bore 204 of the tubular body 200. Then, when the concavity 504 of the rod-like body 500 arrives at a position where the concavity 504 is to be engaged with the ball 209, the ball 209 having been depressed by the lower surface of the large diameter portion 500*a* of the rod-like body 500 till now is operatively projected into the concavity 504 of the rod-like body 500 due to the action of the leaf spring 208 thus being engaged with the concavity 504 of the rod-like body 500. By the engagement of the concavity 504 with the ball 209, the cartridge receiving members 600 and 601 are stationarily located at the position just below the lower opening 301 of the housing body 300. The arranging positions of the respective elements of the locking means are set in a manner to enable the cartridge receiving members 600 and 601 to be stationarily located at the position just below the lower opening 301 of the housing body 300 simultaneously with the engaging of the concavity 504 of the rod-like body 500 with the ball 209. The engagement of the concavity 504 of the rod-like body 500 with the ball 209 can be easily released by pushing the rod-like body 500 toward the first end 201 of the tubular body 200.

When the locking means shown in FIG. 6 is employed, a coil spring 505 may be provided around the small diameter portion 500b of the rod-like body 500 in a manner to be arranged between the large diameter portion 500*a* of the rod-like body 500 and the second end 202 of the tubular body 200 which is blocked up. By the coil spring 505, the rod-like body 500 is always urged towards the first end 201 of the tubular body 200. The coil spring 505 provides the strength necessary to permit the rod-like body 500 to securely push the cartridge receiving means 60 out of the first end 201 of the tubular body 200. In state where the rod-like body 500 is locked with respect to the tubular body 200 against an action of the coil spring 505, when the rod-like body 500 is pushed towards the first end 201 of the tubular body 200 by a user, the rod-like body 500 is rapidly moved toward the first end 201 of the tubular body 200 due to the action of the coil spring 505, while pushing the cartridge receiving means 60.

The dung disposing implement according to the present invention further includes cooperating means for causing one of casing members 400 and 401 of a cartridge 40 to be held on one of the cartridge receiving members 600 and 601 and causing the other of the casing members 400 and 401 of the cartridge 40 to be held on the other of the cartridge receiving members 600 and 601, when the cartridge 40 drops down on the cartridge receiving means 60 by gravity.

Figure 7:
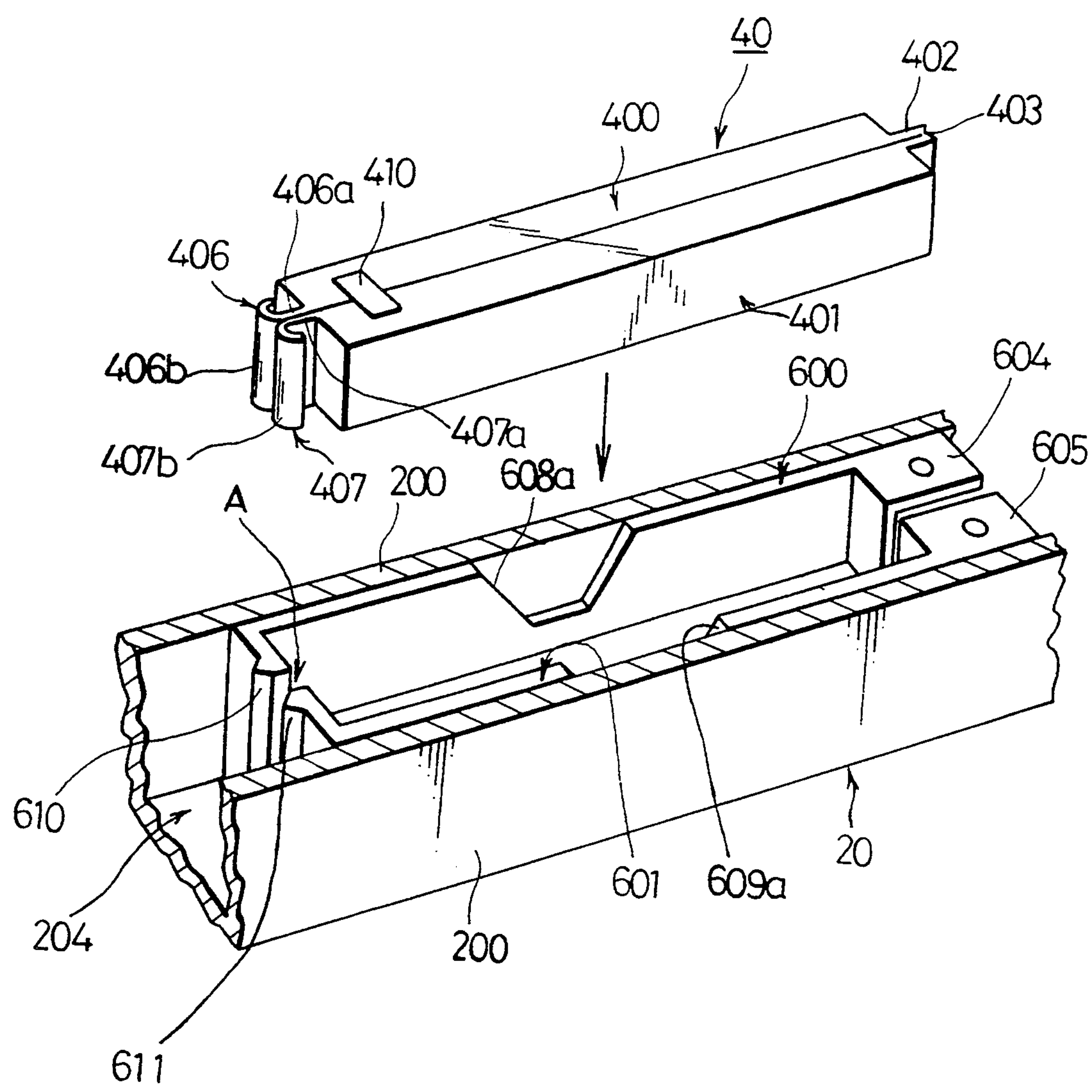
FIG. 7 is a schematic perspective view of assistance in explaining a state in which the cartridge drops down on the cartridge receiving means.
Figure 8:
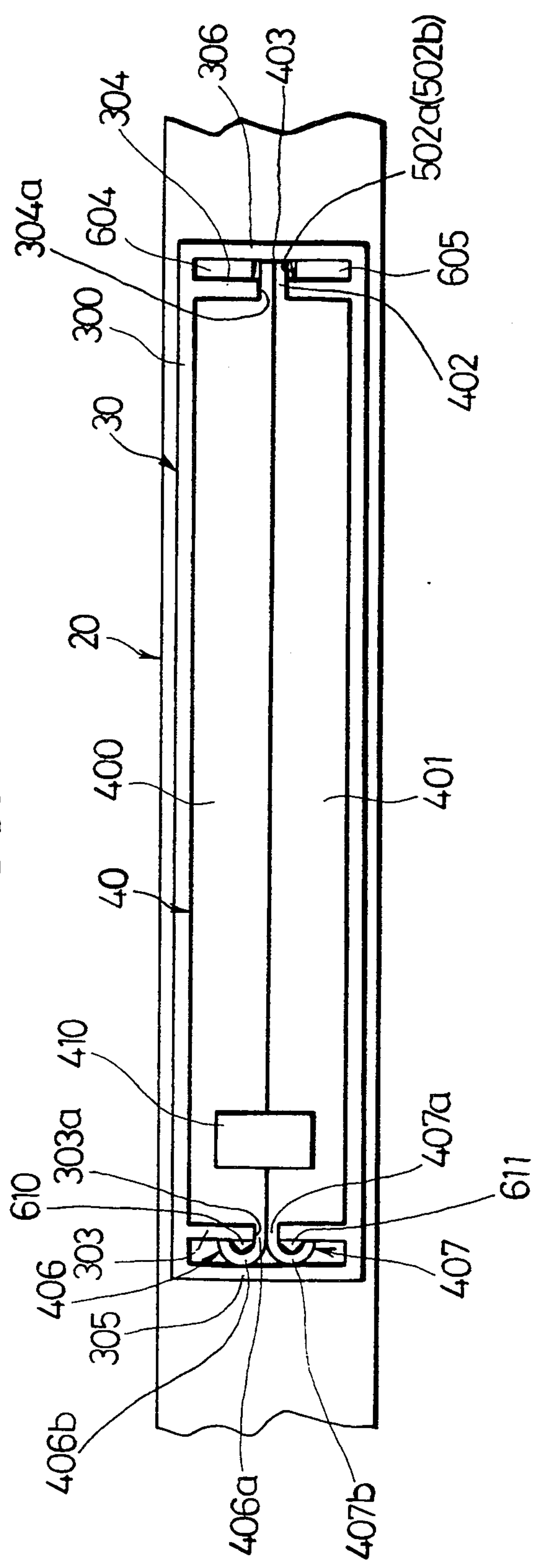
FIG. 8 is a schematic plan view of assistance in explaining a state in which the cartridge has been housed within the storage means.

Again referring to FIGS. 1 and 4, the cooperating means will be discussed. The cooperating means comprises generally hook-like pieces 406 and 407 which extend laterally from faced edge portions of free ends of the casing members 400 and 401 and curve at tip end portions thereof in directions opposite to each other as shown in FIG. 4, and projections 610 and 611 which project laterally from faced edge portions of free ends of the receiving members 600 and 601 as shown in FIG. 1. Referring now to FIG. 7, the projections 610 and 611 are formed in a manner to permit a space A to be provided therebetween when the receiving members 600 and 601 are closed toward each other against the action of the spring 607 stretched between the cartridge receiving members 600 and 601. When a lowermost one of the cartridges 40 vertically stacked within the housing body 300 drops down to the cartridge receiving members 600 and 601 having been located at the position just below the lower opening 301 of the housing body 300, casing members 400 and 401 of the cartridge 40 which are in a state of being closed toward each other are received between the receiving members 600 and 601. At this time, as shown in FIG. 8, root portions 406*a* and 407*a* of hook-like pieces 406 and 407 of the closed casing members 400 and 401 enter the space A between the projections 610 and 611 of the cartridge receiving members 600 and 601. Simultaneously, curved portions 406*b* and 407*b* of the hook-like pieces 406 and 407 come to be engaged with the projections 610 and 611, respectively. Also, a tip end portion of a folded intermediate section 402 of the cartridge 40 is received in the notches 502*a* and 502*b* of the bracket 502 and the space between the root portions 604 and 605 of the cartridge receiving members 600 and 601. Thus, when a lowermost one of the cartridges 40 vertically stacked within the housing body 300 drops down on the receiving members 600 and 601, casing members 400 and 401 of the lowermost cartridge 40 are separately held on the receiving members 600 and 601 through the cooperating means.

Figure 9A:
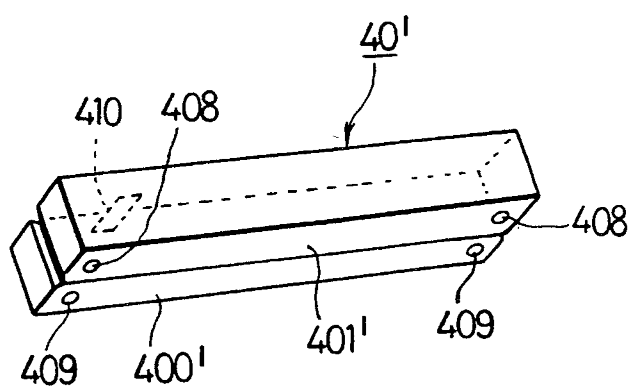
FIGS. 9A and 9B are schematic perspective views showing one example of cooperating means for causing casing members of a cartridge to be separately held on the cartridge receiving members.
Figure 9B:
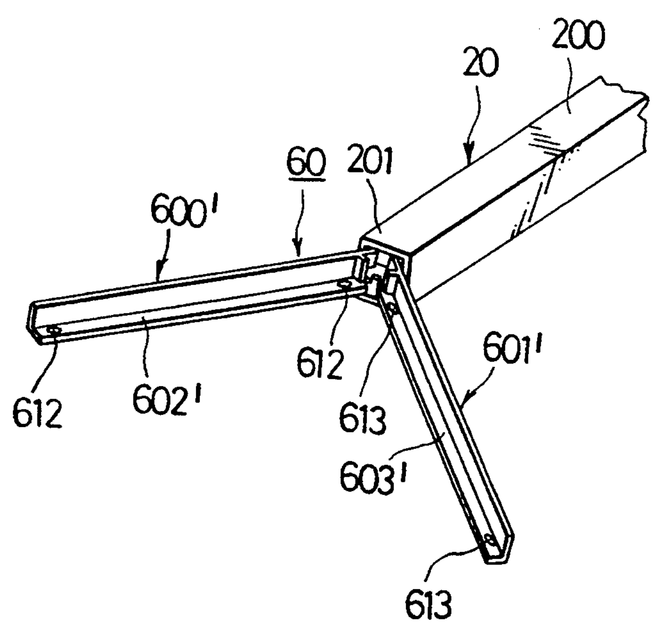

In place of the cooperating means shown in FIGS. 1, 4 and 7, cooperating means comprising elements shown in FIGS. 9A and 9B may be employed. Referring to FIGS. 9A and 9B, the cooperating means comprises projections 408 and 409 respectively formed on under surfaces of casing members 401′ and 400″ of a cartridge 40′, and recesses 612 and 613 respectively formed in top surfaces of horizontal portions 602′ and 603′ of cartridge receiving members 600′ and 601′ Each of the projections 408 and 409 has a hemispheric shape. Also, each of the recesses 612 and 613 has a hemispheric shape. The recesses 612 and 613 are formed at regions of the horizontal portions 602′ and 603′ of the cartridge receiving members 600′ and 601′ The projections 408 and 409 are formed at regions of the casing members 401′ and 400′ which positionally correspond to the recesses 612 and 613 of the cartridge receiving members 600′ and 601′ when the cartridge 40′ drops down on the cartridge receiving members 600′ and 601′. Thus, when the lowermost cartridge 40′ drops down on the receiving members 600′ and 601′, the projections 408 and 409 of the casing members 400′ and 401′ are engaged with the recesses 613 and 612 of the cartridge receiving members 601′ and 600′, respectively, whereby the casing members 400′ and 401′ are separately held on the receiving members 600′ and 601′ through the cooperating means. Incidentally, in the cooperating means comprising the elements shown in FIGS. 9A and 9B, the projections 408 and 409 are provided on the casing members 401' and 400', while the recesses 612 and 613 are formed in the receiving members 600' and 601'. However, the projections 408 and 409 may be provided on the top surfaces of the horizontal portions 602' and 603' of the receiving members 600' and 601', while the recesses 612 and 613 may be formed in the under surfaces of the casing members 400' and 401'.

In a case where the cooperating means comprising the elements shown in FIGS. 1, 4 and 7 is employed, guide means for guiding the cartridges 40 vertically stacked within the housing body 300 may be provided in an interior of the housing body 300. More particularly, as shown in FIGS. 2 and 8, guide plates 303 and 304 are arranged in the interior of the housing body 300 in parallel with side walls 305 and 306 of the housing body 300. The guide plates 303 and 304 respectively have linear guide slits **303*a* and 304*a* extending vertically. Where the guide means is employed, each cartridge 40 is housed within the housing body 300 in a manner such that root portions 406*a* and 407*a* of hook-like pieces 406 and 407 of casing-members 400 and 401 thereof are received in the linear guide slit 303*a* of the guide plate 303. Curved portions 406*b* and 407*b* of the hook-like pieces 406 and 407 are received in a space between the side wall 305 of the housing body 300 and the guide plate 303. An intermediate section 402 folded along a fold line 403 is received in the linear guide slit 304*a* with a tip end thereof being received in a space between the side wall 306 of the housing body 300 and the guide plate 304. Thus, each cartridge 40 can smoothly fall down while being guided along the linear guide slits 303*a* and 304*a*. In this case, the linear guide slit 303*a* is formed in a manner to be aligned with the space A (see FIG. 7) between the projections 610 and 611 of the cartridge receiving members 600 and 601 when the cartridge receiving members 600 and 601 are located at the position just below the lower opening 301 of the housing body 300. Bearing on this, the linear guide slit 304*a* is formed in a manner to he aligned with the notches 502*a* and 502*b* of the bracket 502 and the space between the root portions 604 and 605 of the cartridge receiving members 600 and 601 when the cartridge receiving members 600 and 601 are located at the position just below the lower opening 301 of the housing body 300. Thus, when a lowermost: one of the cartridges 40 vertically stacked within the housing body 300 drops down, root portions 406*a* and 407*a* of hook-like pieces 406 and 407 of the lowermost cartridge 40 which are received in the linear guide slit 303*a* can be smoothly received in the space A between the projections 610 and 611 of the cartridge receiving members 600 and 601. Similarly, a tip end portion of a folded intermediate section 402 of the lowermost cartridge 40 can be smoothly received into the notches 502*a* and 502*b* of the bracket 502 and the space between the root portions 604 and 605 of the cartridge receiving members 600 and 601**.

Figure 10:
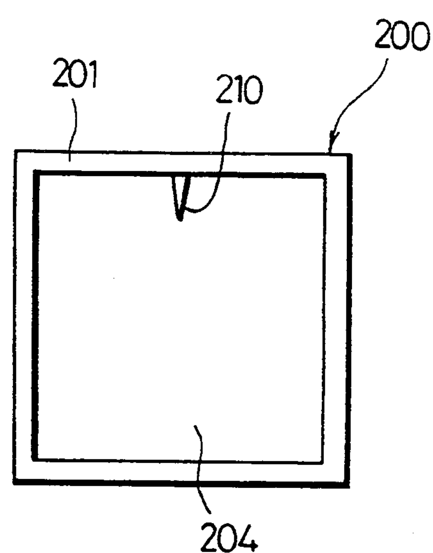
FIG. 10 is an enlarged view of a first end portion of the tubular body, in which a cutter pin is shown.

Each cartridge 40 (40') is disposed of as waste after it receives dung of a pet animal through a sack 404 thereof. When the cartridges 40 (40') contained within the housing body 300 are all consumed, a user removes the cover means 70 from the housing body 300 to put new cartridges 40 (40') into the housing body 300. As described above, each cartridge 40 (40') is produced only by causing a sack 404 to be supported between casing members 400 400') and 401 (401'), folding up the sack 404, and thereafter causing the casing members 400 (400') and 401 (401') to be closed toward each other. Therefore, there is a possibility that casing members 400 (400') and 401 (401') of a cartridge 40 (40'), before the cartridge is housed within the housing body 300, will be accidentally opened away from each other by any external force and cut off from each other at a fold line 403 thereof by the external force. This is undesirable in storage of cartridges. Thus, in order to prevent casing members 400 (400') and 401 (401') of a cartridge, before the cartridge is housed within the housing body 300, from being accidentally opened away from each other, a tape piece 410 may be applied on upper surfaces of free ends of the casing members 400 (400') and 401 (401') in a manner to be laid across the casing members 400 (400') and 401 (401') as shown in FIGS. 7, 8 and 9A. Where the cartridge 40 (40') having the tape piece 410 applied to the casing members 400 (400') and 401 (401') thereof is employed, as shown in FIG. 10, a cutter pin 210 is attached to an upper wall of the first end 201 of the tubular body 200 in a manner to hang from the upper wall of the first end 201 into the longitudinal bore 204 of the tubular body 200. When the cartridge 40 (40') held on the cartridge receiving means 60 through the cooperating means is pushed out of the first end 201 of the tubular body 200, the tape piece 410 of the cartridge 40 (40') is torn across by the cutter pin 210.

Figure 11:
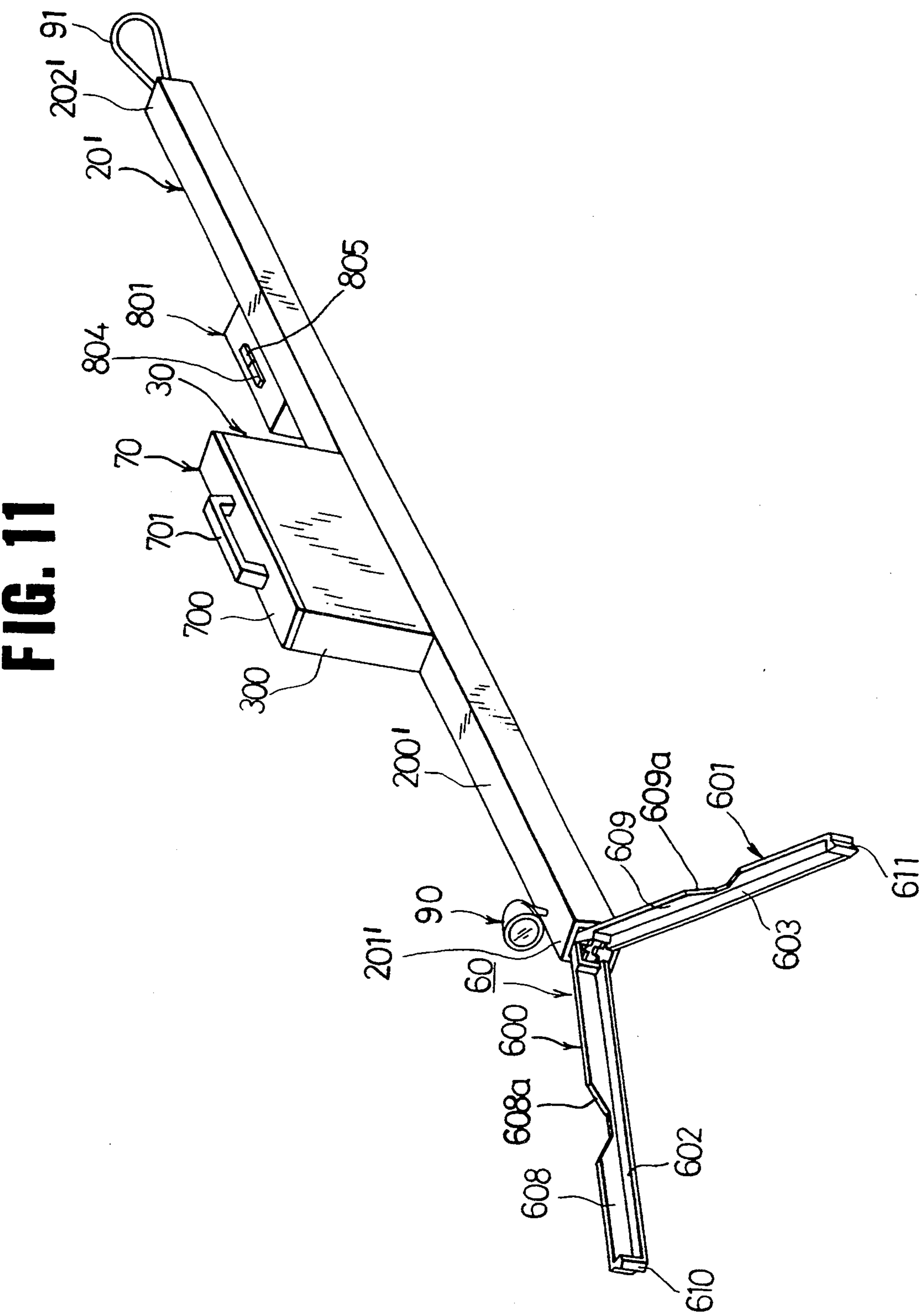
FIG. 11 is a schematic perspective view of an implement for disposing of dung of a pet animal according to a second embodiment of the present invention, in which cartridge receiving members of cartridge receiving means are projected out of a first end of a tubular body and opened away from each other due to an action of a spring stretched between the cartridge receiving members.
Figure 12:
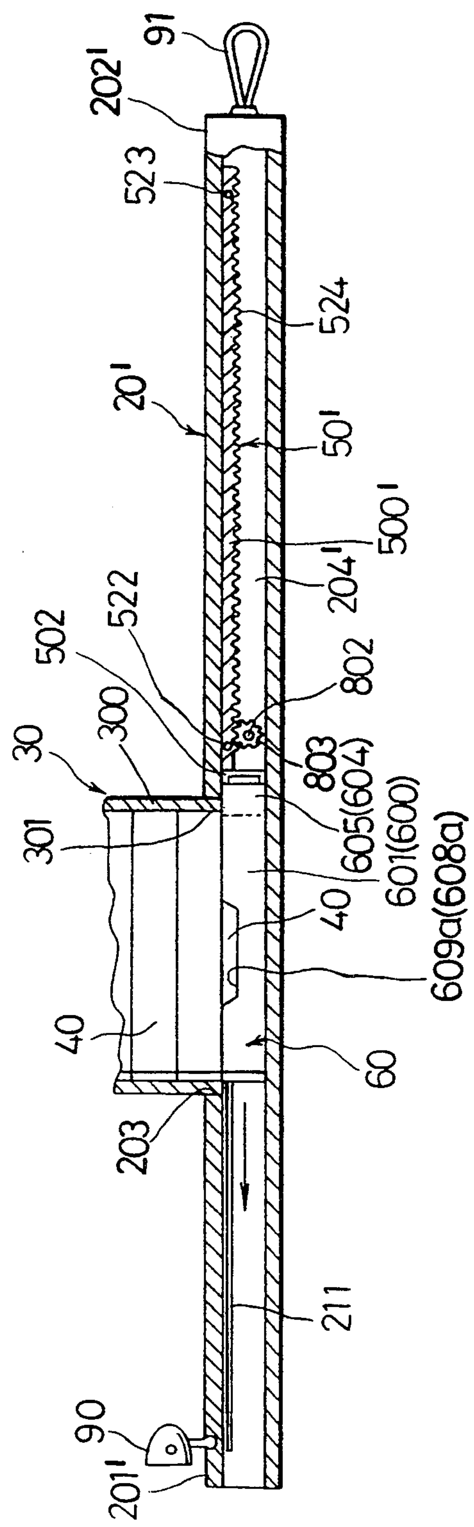
FIG. 12 is a schematic sectional view of the dung disposing implement according to the second embodiment.
Figure 13:
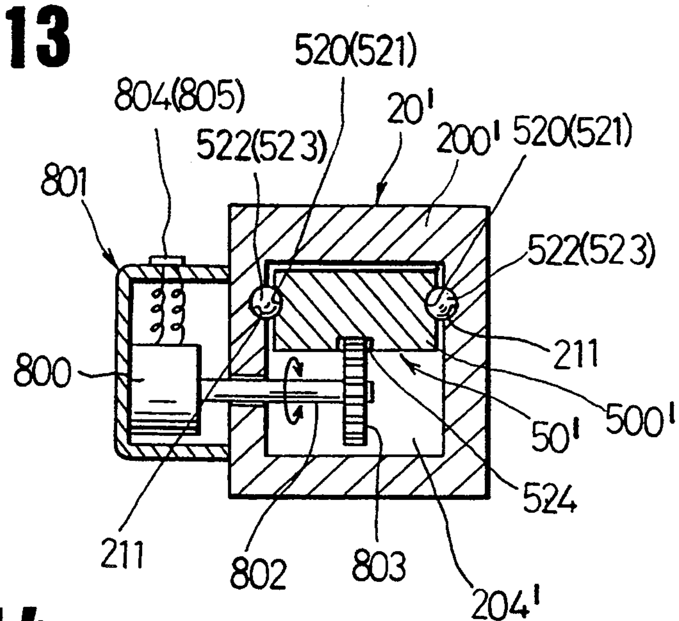
FIG. 13 is an enlarged vertical sectional view of the dung disposing implement according to the second embodiment.

Referring to FIGS. 11 to 13, an implement for disposing of dung of a pet animal according to a second embodiment of the present invention will be discussed. The dung disposing implement according to the second embodiment of the present invention is substantially similar to that according to the first embodiment except that different pusher means is employed and the pusher means is adapted to be automatically moved in a longitudinal bore 204' of a tubular body 200' of the tubular means 20'. In the second embodiment shown in FIGS. 11 to 13, elements which are similar to those shown in FIGS. 1 to 8 are designated with like reference numerals and the description of them will not be repeated.

Pusher means 50' comprises a rod-like body 500' which is inserted in the longitudinal bore 204' of the tubular body 200' and movably supported to the tubular body 200'. As shown in FIGS. 12 and 13, a linear guide groove 211 is formed in an inner surface of each of opposite longitudinal walls of the tubular body 200' in a manner to extend along the longitudinal bore 204' of the tubular body 200'. Bearing on this, at least two recesses 520 and 521 are formed in each of opposite longitudinal sides of the rod-like body 500' in a manner to be respectively arranged at portions of the rod-like body 500' which are near tip and rear ends of the rod-like body 500'. Balls 522 and 523 are rollably received in the recesses 520 and 521, respectively. The balls 522 and 523 rollably received in the recesses 520 and 521 are engaged with the linear guide grooves 211 of the tubular body 200', so that the rod-like body 500' of the pusher means 50' may be smoothly movable in the longitudinal bore 204' of the tubular body 200' while being guided along the linear grooves 211 through the balls 522 and 523. The rod-like body 500' of the pusher means 50' has a plurality of teeth 524 formed along a longitudinal direction of a lower part of the rod-like body 500', thereby constituting a rack. Like the rod-like body 500 of the first embodiment, the rod-like body 500' of the second embodiment has the cartridge receiving members 600 and 601 pivotally connected to the tip end thereof through the bracket 502 as shown in FIG. 12, between which cartridge receiving members 600 and 601 the spring (not shown) is stretched.

The dung disposing implement according to the second embodiment of the present invention comprises actuating means for automatically moving the rod-like body 500' of the pusher means 50' in the longitudinal bore 204' of the tubular body 200'. The actuating means includes a reversible motor 800 housed within a box 801 which is mounted on a longitudinal wall near a second end 202' of the tubular body 200'. A rotating shaft 802 10 of the reversible motor 800 penetrates the longitudinal wall of the tubular body 200' and projects in the longitudinal bore 204' of the tubular body 200' at its tip end in a manner to be perpendicular to the rod-like body 500' of the pusher means 50'. The actuating means further includes a pinion 803 which is attached to the tip end of the rotating shaft 802 to be mated with the teeth 524 of the rod-like body 500'. Projected upwardly from the box 801 as shown in FIG. 11 are switching buttons 804 and 805 for reversible motor 800. One of the switching buttons 804 and 805, for example, the switching button 804, serves to cause the rotating shaft 802 of the reversible motor 800 to be rotated in a counterclockwise direction. The other of the switching buttons 804 and 805, namely, the switching button 805, serves to cause the rotating shaft 802 of the reversible motor 800 to be rotated in a clockwise direction. The reversible motor 800 is electrically connected to at least one dry battery (not shown) housed within the box 801.

Incidentally, reference numerals 90 and 91 designate any suitable lighting fixture and a loop, respectively. The loop 91 serves as means to hang the dung disposing implement on, for example, a wall of a user's house therethrough when the dung disposing implement is in nonuse.

In state where the cartridge receiving members 600 and 601 are located at the position just below the lower opening 301 of the housing body 300 as shown in FIG. 12, when the switching button 804 is pressed to cause the rotating shaft 802 of the reversible motor 800 to be rotated in the counterclockwise direction, the pinion 803 secured to the tip end of the rotating shaft 802 of the reversible motor 800 is rotated in the same direction, whereby the rod-like body 500' engaged with the pinion 803 through the teeth 524 thereof is automatically moved toward a first end 201' of the tubular body 200'. Simultaneously with the movement of the rod-like body 500', the cartridge receiving means 60 connected to the tip end of the rod-like body 500' is also moved toward the first end 201' of the tubular body 200'. When the cartridge receiving means 60 is pushed out of the first end 201' of the tubular body 200' by further movement of the rod-like body 500', the cartridge receiving members 600 and 601 of the cartridge receiving means 60 are opened away from each other due to the action of the spring (not shown) stretched between the cartridge receiving members 600 and 601 as referred to in the description of the first embodiment.

Conversely, in state where the cartridge receiving members 600 and 601 are projected out of the first end 201' of the tubular body 200', when the switching button 805 is pressed to cause the rotating shaft 802 of the reversible motor 800 to be rotated in the clockwise direction, the pinion 803 is rotated in the same direction, whereby the rod-like body 500' is automatically moved toward the second end 202' of the tubular body 200'. Simultaneously with the backward movement of the rod-like body 500', the cartridge receiving members 600 and 601 are retracted into the longitudinal bore 204' of the tubular body 200' while being closed toward each other against the action of the spring stretched between the receiving members 600 and 601. Like the rod-like body 500 of the first embodiment, the rod-like body 500' of the second embodiment is adapted to be locked with respect to the tubular body 200' whereby the cartridge receiving means 60 can be stationarily located at the position just below the lower opening 301 of the housing body 300. More particularly, even as the balls 523 rollably received in the recesses 521 formed at portions of the opposite longitudinal sides of the rod-like body 500' which are near the rear end portion of the rod-like body 500' are abutted against trailing edges of the linear guide grooves 211 of the tubular body 200', the cartridge receiving members 600 and 601 are stationarily located at the position just below the lower opening 301 of the housing body 300.

Figure 14:
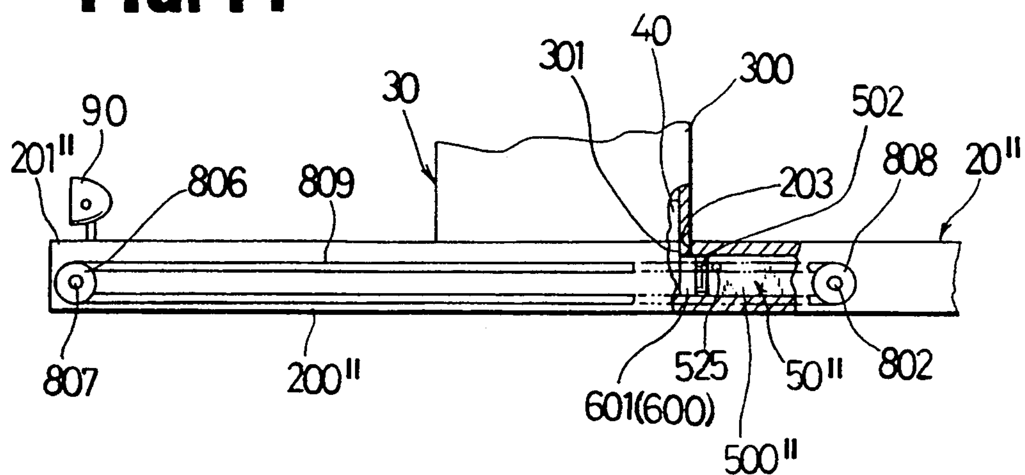
FIG. 14 is a front elevational view of an alternative design for the dung disposing implement according to the second embodiment, with a part broken away to reveal pusher means.
Figure 15:
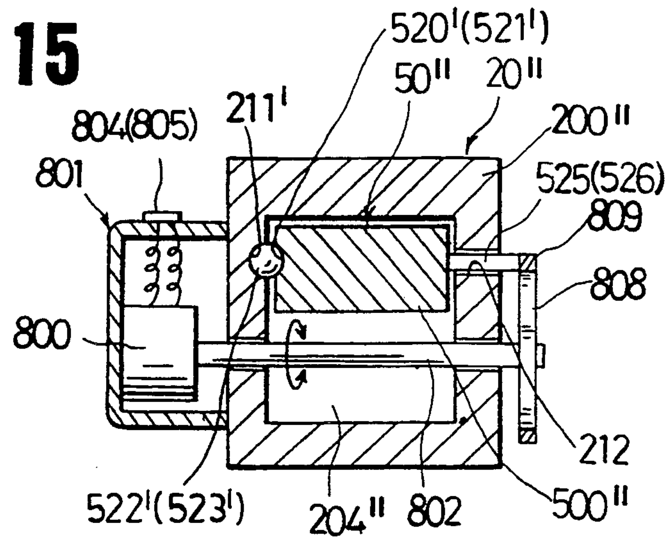
FIG. 15 is an enlarged vertical sectional view of the dung disposing implement shown in FIG. 14.

Referring to FIGS. 14 and 15, an alternative design for the implement for disposing of dung of a pet animal according to the second embodiment of the present invention will be described. This alternative design is substantially similar to the dung disposing implement shown in FIGS. 11 to 13 except that different pusher means is employed and different actuating means for automatically moving the pusher means 50'' in a longitudinal bore 204'' of a tubular body 200'' is employed. In the alternative design of FIGS. 14 and 15, elements which are similar to those shown in FIGS. 11 to 13 are designated with like reference numerals and the description of them will not be repeated.

Pusher means 50'' comprises a rod-like body 500'' which is inserted in the longitudinal bore 204'' of the tubular body 200'' and movably supported to the tubular body 200''. As shown in FIG. 15, a linear guide groove 211' is formed in an inner surface of one of opposite longitudinal walls of the tubular body 200'' in a manner to extend along the longitudinal bore 204'' of the tubular body 200''. Bearing on this, at least two recesses 520' and 521' are formed in one of opposite longitudinal sides of the rod-like body 500'' in a manner to be respectively arranged at portions of the rod-like body 500'' which are near rear and tip ends of the rod-like body 500''. Balls 522' and 523' are rollably received in the recesses 520' and 521', respectively. The balls 522' and 523' rollably received in the recesses 520' and 521' are engaged with the linear guide groove 211' of the tubular body 200'', so that the rod-like body 500'' of the pusher means 50'' may be smoothly moved in the longitudinal bore 204'' of the tubular body 200'' while being guided along the linear groove 211' through the balls 522' and 523' The tubular body 200'' further has a linear slit 212 formed in the other of the opposite longitudinal walls thereof in a manner to extend along the longitudinal bore 204'' of the tubular body 200''. Like the rod-like body 500' shown in FIGS. 12 and 13, the rod-like body 500'' of this alternative design has the cartridge receiving members 600 and 601 pivotally connected to the tip end thereof through the bracket 502, between which cartridge receiving members 600 and 601 the spring (not shown) is stretched. The rod-like body 500'' of the pusher means 50'' has at least two pin-like projections 525 and 526 provided on the other of the opposite longitudinal sides thereof in a manner to be perpendicular to the tubular body 200'', tip ends of which at least two pin-like projections 525 and 526 project outwardly from the tubular body 200'' via the linear slit 212 of the tubular body 200''. The at least two projections 525 and 526 are respectively arranged at portions of the rod-like body 500″ which are near rear and tip end portions of the rod-like body 500″.

Actuating means for automatically moving the rod-like body 500″ of the pusher means 50″ in the longitudinal bore 204″ of the tubular body 200″ comprises a reversible motor 800 housed within a box 801 which is mounted on the side wall near a second end (not shown) of the tubular body 200″, a rotating shaft 802 of which reversible motor 800 penetrates the tubular body 200″ of the tubular means 20″ in a direction perpendicular to the tubular body 200″; a first pulley 806 supported to a side wall portion near a first end 201″ of the tubular body 200″ through a pin 807; a second pulley 808 secured to a tip end of the rotating shaft 802 of the reversible motor 800 which projects outwardly from the tubular body 200″; and a belt 809 coupling the first pulley 806 and the second pulley 808. The tip ends of the at least two pin-like projections 525 and 526 of the rod-like body 500″, which project outwardly from the tubular body 200″ through the linear slit 212 of the tubular body 200″, are connected to the belt 809.

Incidentally, the parts exposed to the outside, i.e., the pulleys 806, 808 and the belt 809 may be covered with any suitable cover means.

In a state shown in FIG. 14, when the rotating shaft 802 of the reversible motor 800 is rotated in a counter-clockwise direction, the second pulley 808 is rotated in the same direction to cause the belt 809 to travel toward the first end 201″ of the tubular body 200″. Simultaneously with the travelling of the belt 809, the rod-like body 500″ connected to the belt 809 through the at least two pin-like projections 525 and 526 is moved toward the first end 201″ of the tubular body 200″ while being guided along the linear guide groove 211′ of the tubular body 200″ through the balls 522′ and 523′, whereby the cartridge receiving members 600 and 601 pivotally connected to the tip end of the rod-like body 500″ is also moved toward the first end 201″ of the tubular body 200″. Then, when the-cartridge receiving members 600 and 601 are pushed out of the first end 201″ of the tubular body 200″, they are opened away from each other due to the action of the spring (not shown) stretched between the cartridge receiving members 600 and 601.

In state where the cartridge receiving members 600 and 601 are projected out of the first end 201″ of the tubular body 200″, when the rotating shaft 802 of the reversible motor 800 is rotated in a clockwise direction, the second pulley 808 is rotated in the same direction to cause the belt 809 to travel toward the second end of the tubular body 200″. Simultaneously with the travelling of the belt 809, the rod-like body 500″ connected to the belt 809 through the pin-like projections 525 and 526 thereof is also moved toward the second end of the tubular body 200″. By the movement of the rod-like body 500″ toward the second end of the tubular body 200″, the cartridge receiving members are retracted into the longitudinal bore 204″ of the tubular body 200″ while being closed toward each other against the action of the spring (not shown) stretched between the cartridge receiving members 600 and 601. Like the rod-like body 500′ of the dung disposing implement shown in FIGS. 11, 12 and 13, the rod-like body 500″ of this alternative design is adapted to be locked with respect to the tubular body 200″ whereby the cartridge receiving members 600 and 601 are stationarily located at the position just below the lower opening 301 of the housing body 300. More particularly, even as the pin-like projection 526 arranged at a portion of the rod-like body 500″ which is near the rear end portion of the rod-like body 500″ is abutted against a trailing edge of the linear slit 212 of the tubular body 200″, the cartridge receiving members 600 and 601 are stationarily located at the position just below the lower opening 301 of the housing body 300.

Incidentally, in the dung disposing implements of the second embodiment and the alternative design, the lighting fixture 90 is provided at an upper wall of the first end 201′ (or 201″) of the tubular body 200′ (or 200″). The lighting fixture 90 may be provided at an upper wall of the first end 201 of the tubular body 200 of the first embodiment. Thus, when a user walks a pet animal at night, the user can effectively carry out the work of disposing of dung of the pet animal while illuminating a rump of the pet animal by means of the lighting fixture 90.

The operation of the dung disposing implement according to the present invention will be described with reference to the accompanying drawings.

When the cartridge receiving members 600 and 601 (or 600′ and 601′) are closed toward each other against the action of the spring 607 stretched between the cartridge receiving members 600 and 601 (or 600′ and 601′) and located at the position just below the lower opening 301 of the housing body 300, a lowermost one of the cartridges 40 (or 40′) vertically stacked within the housing body 300 drops down on the receiving members 600 and 601 (or 600′ and 601′) by-gravity and casing members 400 and 401 (or 400′ and 401′) of the lowermost cartridge 40 (or 40′) are separately held on the cartridge receiving members 600 and 601 (or 600′ and 601′) through the cooperating means. In this state, when the rod-like body 500 (or 500′ or 500″) of the pusher means 50 (or 50′ or 50″) is pushed toward the first end 201 (or 201′ or 201″) of the tubular body 200 (or 200′ or 200″), the cartridge receiving members 600 and 601 (or 600′ and 601′) having the casing members 400 and 401 (or 400′ and 401′) held thereon through the cooperating means are also moved toward the first end 201 (or 201′ or 201″) of the tubular body 200 (or 200′ or 200″) and then operatively projected out of the first end 201 (or 201′ or 201″) of the tubular body 200 (or 200′ or 200″). At this time, the cartridge receiving members 600 and 601 (or 600′ and 601′) are opened away from each other due to the action of the spring 607 stretched between the cartridge receiving members 600 and 601 (or 600′ and 601′), whereby the casing members 400 and 401 (or 400′ and 401′) separately held on the cartridge receiving members 600 and 601 (or 600′ and 601′) are simultaneously opened away from each other, resulting in an opening 405 of a sack 404 supported between the casing members 400 and 401 (or 400′ and 401′) being completely opened. In state where the opening 405 of the sack 404 is opened, a user points the tubular body 200 (or 200′ or 200″) to a pet animal in a manner to cause the opened sack 404 to be held to a rump of the pet animal, whereby the sack 404 can receive dung excreted from the pet animal therein.

After the cartridge 40 (or 40′) receives dung of the pet animal through the sack 404 thereof, the user removes the cartridge 40 (or 40′) from the cartridge receiving members 600 and 601 (or 600′ and 601′) by picking up the cartridge 40 (or 40′) while causing the casing members 400 and 401 (or 400′ and 401′) to be closed toward each other with the user's fingers. Then, the cartridge is dumped into a waste box.

Incidentally, in order that a user may easily remove casing members 400 and 401 of a cartridge 40 from the cartridge receiving members 600 and 601 with the user's fingers after the cartridge receives dung of a pet animal through a sack 404 thereof, notches 608*a* and 609*a* large enough to allow the user's fingers to be inserted therethrough may be respectively formed in the vertical portions 608 and 609 of the cartridge receiving members 600 and 601 as shown in FIGS. 1, 2, 7, 11 and 12. After the cartridge 40 (or 40') receiving dung of the pet animal is removed from the cartridge receiving members 600 and 601 (or 600' and 601'), when the rod-like body 500 (or 500' or 500'') is moved toward the second end of the tubular body 200 (or 200' or 200''), the cartridge receiving members 600 and 601 (or 600' and 601') are retracted into the longitudinal bore 204 (or 204' or 204'') of the tubular body 200 (or 200' or 200'') while being closed toward each other against the action of the spring 607 stretched between the cartridge receiving members 600 and 601 (or 600' and 601'). Then, when the closed receiving members 600 and 601 (or 600' and 601') are located at the position just below the lower opening 301 of the housing body 300, a lowermost one of the cartridges 40 (or 40') vertically stacked within the housing body 300 drops down on the cartridge receiving members 600 and 601 (or 600' and 601') by gravity. Thus, the lowermost cartridge 40 (or 40') on the cartridge receiving members 600 and 10 601 (or 600' and 601') comes into a stand-by condition.

Thus, it will be noted that the dung disposing implement according to the present invention can easily cause an opening of a sack supported between casing members of a cartridge to be opened without resort to such a resilient wire as a cartridge disclosed in each of the above-described U.S. patents has.

It will be also noted that a cartridge of the dung disposing implement according to the present invention is simpler in construction and lower in cost since it does not include such resilient wire as the cartridge of each of the conventional dung disposing implement has.

It will thus be seen that the objects set forth above, and those made apparent from tile preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An implement for disposing of dung of a pet animal, comprising:

tubular means comprising an elongated tubular body having first and second ends;

storage means mounted on an upper wall of said elongated tubular body of said tubular means for carrying vertically stacked cartridges therein;

each of said cartridges including a pair of casing members hingedly connected at one ends thereof to each other and sack means having an opening for receiving dung of the pet animal, said sack means supported between said casing members in a manner to be folded up;

cartridge receiving means inserted in a longitudinal bore of said tubular body for receiving a lowermost one of said cartridges vertically stacked within said storage means when said lowermost cartridge drops down from said storage means toward said longitudinal bore of said tubular body by gravity;

pusher means movably inserted in said longitudinal bore of said tubular body for pushing toward said first end of said tubular body said lowermost cartridge received by said cartridge receiving means;

said cartridge receiving means including a pair of cartridge receiving members pivotally connected at one ends thereof to said pusher means, and spring means provided between said cartridge receiving members to always urge said cartridge receiving members to be opened away from each other; and cooperating means on said cartridge receiving members and said casing members of each of said cartridges for causing one of said casing members to be held on one of said cartridge receiving members and causing the other of said casing members to be held on the other of said cartridge receiving members when each of said cartridges is received by said cartridge receiving means.

2. An implement for disposing of dung of a pet animal as defined in claim 1, wherein each of said cartridge receiving members has a substantially L-shaped body in vertical section, said cartridge receiving members being pivotally connected at said one ends thereof to said pusher means with horizontal portions thereof being faced to each other; wherein each of said casing members includes a substantially box-like body having a substantially U-like configuration in vertical section, said casing members being hingedly connected at said one ends thereof to each other with opened sides thereof being faced to each other; and wherein said cooperating means comprises a hook-like piece and projection combination, said hook-like piece and projection combination including hook-like pieces formed at faced edge portions of free ends of said casing members, said hook-like pieces having root portions extending laterally from said faced edge portions of said free ends of said casing members and curved portions curving from said root portions in directions opposite to each other, and projections projecting laterally from faced edge portions of free ends of said cartridge receiving members, said projections being formed in a manner to allow a space to be provided therebetween when said cartridge receiving members are closed toward each other against an action of said spring means, so that when each of said cartridges drops down onto said cartridge receiving members, said root portions of said hook-like pieces of said casing members are received in the space between said projections of said cartridge receiving members and each of said curved portions of said hook-like pieces is engaged with one of said projections of said cartridge receiving members.

3. An implement for disposing of dung of a pet animal as defined in claim 2, wherein each of vertical portions of said L-shaped cartridge receiving members has a notch large enough to allow a user's finger to be inserted therethrough.

4. An implement for disposing of dung of a pet animal as defined in claim 1, further including locking means for locking said pusher means with respect to said tubular means to cause said cartridge receiving members to be stationarily located at a position just below said storage means even as said cartridge receiving members arrive at said position.

5. An implement for disposing of dung of a pet animal as defined in claim 1, further including guide means for guiding said cartridges vertically stacked within said storage means.

6. An implement for disposing of dung of a pet animal as defined in claim 5, wherein each of said cartridge receiving members has a substantially L-shaped body in vertical section, said cartridge receiving members being pivotally connected at said one ends thereof to said pusher means with horizontal portions thereof being faced to each other and with said one ends thereof being spaced apart from each other; wherein each of said casing members includes a substantially box-like body having a substantially U-like configuration in vertical section, said casing members integrally interconnected at edge portions of said one ends thereof through an intermediate section with opened sides thereof being faced to each other, said intermediate section being formed with a fold line extending vertically at substantially the midpoint along a width direction of said intermediate section, said fold line acting as a hinge between said casing members; wherein said cooperating means comprises a hook-like piece and projection combination, said hook-like piece and projection combination comprising hook-like pieces formed at faced edge portions of free ends of said casing members, said hook-like pieces having root portions extending laterally from said faced edge portions of said free ends of said casing members and curved portions extending from said root portions in directions opposite to each other, and projections projecting laterally from faced edge portions of free ends of said cartridge receiving members; wherein said storage means comprises a substantially box-like housing body having upper and lower openings; wherein said tubular body has an opening formed in a predetermined portion of an upper wall thereof, said box-like housing body being fitted at its lower opening portion in said opening of said tubular body; and wherein said guide means comprises first and second spaced guide plates provided in said housing body, each of said guide plates being separated from both side walls of said housing body and arranged in parallel with said both side walls of said housing body, each of said guide plates having a linear guide slit, each of said cartridges being housed within said housing body with said casing members thereof being closed toward each other, with said intermediate section thereof being folded along said fold line, with said root portions of said hook-like pieces of said closed casing members being received in a guide slit of said first guide plate, with said curved portions of said hook-like pieces being received in a space between said first guide plate and one of said both side walls of said housing body, and with said folded intermediate section being received in a guide slit of said second guide plate in a manner to project at a tip end of said folded intermediate section in a space between walls said second guide plate and the other of said both side walls of said housing body, said projections of said hook-like piece and projection combination being formed in a manner to allow a space to be provided therebetween when said cartridge receiving members are closed toward each other against an action of said spring means, said space between said projections of said hook-like piece and projection combination being adapted to be aligned with said guide slit of said first guide plate when said cartridge receiving members arrive at a position just below said lower opening of said housing body, a space between the pivotally connecting portions of said cartridge receiving members being adapted to be aligned with said guide slit of said second guide plate, when said cartridge receiving members arrive at said position just below said lower opening of said housing body.

7. An implement for disposing of dung of a pet animal as defined in claim 6, further including cover means for covering said upper opening portion of said housing body.

8. An implement for disposing of dung of a pet animal as defined in claim 1, wherein said tubular body is provided with a cutter pin hanging from an upper wall of said first end thereof into said longitudinal bore of said tubular body; and wherein each of said cartridges includes a tape piece applied across an upper surface of said casing members thereof to cause said casing members to be closed toward each other.

9. An implement for disposing of dung of a pet animal as defined in claim 1, further including actuating means for automatically moving said pusher means toward said first end of said tubular body and automatically returning said pusher means toward said second end of said tubular body.

10. An implement for disposing of dung of a pet animal as defined in claim 9, wherein said tubular body has a linear guide groove formed in an inner surface of each of opposite longitudinal walls thereof in a manner to extend along said longitudinal bore of said tubular body; wherein said pusher means comprises a rod-like body having a plurality of teeth formed along a longitudinal direction of a lower part of said rod-like body, thereby constituting a rack, said rod-like body having at least two spaced recesses formed therein in a manner to be disposed along each of opposite longitudinal sides of said rod-like body, in which said at least two recesses balls are rollably received, said balls being engaged with said guide grooves of said tubular body; and wherein said actuating means includes a reversible motor arranged on a wall portion of said tubular body near said second end of said tubular body in a manner such that a rotating shaft thereof penetrates the wall portion of said tubular body in a direction perpendicular to said rod-like body of said pusher means to project in said longitudinal bore of said tubular body at a tip end of said rotating shaft, and a pinion attached to said tip end of said rotating shaft of said reversible motor to be engaged with said teeth of said rod-like body, so that when said rotating shaft of said reversible motor is rotated in one of clockwise and counterclockwise directions, said pinion is rotated in the same direction to move said rod-like body toward said first end of said tubular body and when said rotating shaft of said reversible motor is rotated in the other of the clockwise and counterclockwise directions, said pinion is rotated in the same direction to move said rod-like body toward said second end of said tubular body.

11. An implement for disposing of dung of a pet animal as defined in claim 10, wherein each of said cartridge receiving members has a substantially L-shaped body in vertical section, said cartridge receiving members being pivotally connected at said one ends thereof to a tip end of said rod-like body of said pusher means with horizontal portions thereof being faced to each other; wherein each of said casing members includes a substantially box-like body having a substantially U-like configuration in vertical section, said casing members being hingedly connected at said one ends thereof to each other with opened sides thereof being faced to each other; and wherein said cooperating means comprises a hook-like piece and projection combination, said hook-like piece and combination including hook-like pieces formed at faced edge portions of free ends of said casing members, said hook-like pieces having root portions extending laterally from said faced edge portions of said free ends of said casing members and curved portions curving from said root portions in directions opposite to each other, and projections projecting laterally from faced edge portions of free ends of said cartridge receiving members, said projections of said hook-like piece and projection combination being formed in a manner to allow a space to be provided therebetween when said cartridge receiving members are closed toward each other against an action of said spring means.

12. An implement for disposing of dung of a pet animal as defined in claim 11, wherein each of vertical portions of said L-shaped cartridge receiving members has a notch large enough to allow a user's finger to be inserted therethrough.

13. An implement for disposing of dung of a pet animal as defined in claim 10, wherein each of said cartridge receiving members has a substantially L-shaped body in vertical section, said cartridge receiving members being pivotally connected at said one ends thereof to said pusher means with horizontal portions thereof being faced to each other; wherein each of said casing members includes a substantially box-like body having a substantially U-like configuration in vertical section, said casing members being hingedly connected at said one ends thereof to each other with opened sides thereof being faced to each other; and wherein said cooperating means comprises a projection and recess combination, said projection and recess combination including projections formed on an under surface of each of said casing members, each of said projections of said projection and recess combination having a substantially hemispheric shape, and recesses formed in a top surface of a horizontal portion of each of said L-shaped cartridge receiving members, each of said recesses of said projection and recess combination having a substantially hemispheric shape, said recesses of said projection and recess combination corresponding in number to said projections of said combination, said projections of said combination being adapted to be engaged with corresponding recesses of said combination when each of said cartridges drops down onto said cartridge receiving members.

14. An implement for disposing of dung of a pet animal as defined in claim 9, further including locking means for locking said pusher means with respect to said tubular means to cause said cartridge receiving members to be stationarily located at a position just below said storage means.

15. An implement for disposing of dung of a pet animal as defined in claim 9, further including guide means for guiding said cartridges vertically stacked within said storage means.

16. An implement for disposing of dung of a pet animal as defined in claim 15, wherein each of said cartridge receiving members has a substantially L-shaped body in vertical section, said cartridge receiving members being pivotally connected at said one ends thereof to said pusher means with horizontal portions thereof being faced to each other and with said one ends thereof being spaced apart from each other; wherein each of said casing members includes a substantially box-like body having a substantially U-like configuration is vertical section, said casing members integrally interconnected at edge portions of said one ends thereof through an intermediate section with opened sides thereof being faced to each other, said intermediate section being formed with a fold line extending vertically at substantially the midpoint along a width direction of said intermediate section, said fold line acting the a hinge between said casing members; wherein said cooperating means comprises a hook-like piece and projection combination, said hook-like piece and projection combination comprising hook-like pieces formed at faced edge portions of free ends of said casing members, said hook-like pieces having root portions extending laterally from said faced edge portions of said free ends of said casing members and curved portions curving from said root portions in directions opposite to each other, and projections projecting laterally from faced edge portions of free ends of said cartridge receiving members; wherein said storage means comprises a substantially box-like housing body having upper and lower openings; wherein said tubular body has an opening formed in a predetermined portion of an upper wall thereof, said box-like housing body being fitted at its lower opening portion in said opening of said tubular body; wherein said guide means comprises first and second spaced guide plates provided in said housing body, each of said guide plates being separated from both side walls of said housing body and arranged in parallel with said both side walls of said housing body, each of said guide plates having a linear guide slit, each of said cartridges being housed within said housing body with said casing members thereof being closed toward each other, with said intermediate section thereof being folded along said fold line, with said root portions of said hook-like pieces of said closed casing members being received in a guide slit of said first guide plate, with said curved portions of said hook-like pieces being received in a space between said first guide plate and one of said both side walls of said housing body, and with said folded intermediate section being received in a guide slit of said second guide plate in a manner to project at a tip end of said folded intermediate section in a space between said second guide plate and the other of said both side walls of said housing body, said projections of said combination being formed in a manner to allow a space to be provided therebetween when said cartridge receiving members are closed toward each other against an action of said spring means, said space between said projections of said hook-like piece and projection combination being adapted to be aligned with said guide slit of said first guide plate when said cartridge receiving members arrive at a position just below said lower opening of said housing body, a space between the pivotally connecting portions of said cartridge receiving members being adapted to be aligned with said guide slit of said second guide plate, when said cartridge receiving members arrive at said position just below said lower opening of said housing body.

17. An implement for disposing of dung of a pet animal as defined in claim 16, further including cover means for covering said upper opening of said housing body.

18. An implement for disposing of dung of a pet animal as defined in claim 9, wherein said tubular body is provided with a cutter pin hanging from an upper wall of said first end thereof into said longitudinal bore of said tubular body; and wherein each of said cartridges has a tape piece applied across upper surfaces of said casing members thereof to cause said casing members to be closed toward each other.

19. An implement for disposing of dung of a pet animal as defined in claim 9, wherein said tubular body has a linear groove formed in an inner surface of one of opposite longitudinal wall portions thereof in a manner to extend along said longitudinal bore of said tubular body, and a linear slit formed in the other of said opposite longitudinal wall portions of said tubular body in a manner to extend along said longitudinal bore of said tubular body; wherein said pusher means comprises a rod-like body movably inserted in said longitudinal bore of said tubular body, said rod-like body having at least two recesses formed in one of opposite longitudinal sides of said rod-like body, in each of which said at least two recesses a ball is rollably received, said ball being engaged with said groove of said tubular body, and at least two pin-like projections provided on the other of said opposite longitudinal sides of said rod-like body to project outwardly through said linear slit of said tubular body; and wherein said actuating means comprises a reversible motor arranged on said tubular body in a manner such that a rotating shaft thereof penetrates said tubular body in a direction perpendicular to said tubular body, a first pulley supported to a portion of said tubular body which is near said first end of said tubular body, a second pulley attached to a tip end of said rotating shaft of said reversible motor which penetrates said tubular body, and a belt coupling said first and second pulleys, said at least two pin-like projections of said rod-like body of said pusher means, which project outwardly through said linear slit of said tubular body, being connected at tip ends thereof to said belt.

20. An implement for disposing of dung of a pet animal as defined in claim 19, wherein each of said cartridge receiving members has a substantially L-shaped body in vertical section, said cartridge receiving members being pivotally connected at said one ends thereof to a tip end of said rod-like body of said pusher means with horizontal portions thereof being faced to each other; wherein each of said casing members includes a substantially box-like body having a substantially U-like configuration in vertical section, said casing members being hingedly connected at said one ends thereof to each other with opened sides thereof being faced to each other; and wherein said cooperating means comprises a hook-like piece and projection combination, said combination including hook-like pieces formed at faced edge portions of free ends of said casing members, said hook-like pieces having root portions extending laterally from said faced edge portions of said free ends of said casing members and curved portions curving from said root portions in directions opposite to each other, and projections projecting laterally from faced edge portions of free ends of said cartridge receiving members, said projections of said hook-like piece and projection combination being formed in a manner to allow a space to be provided therebetween when said cartridge receiving members are closed toward each other against an action of said spring means.

21. An implement for disposing of dung of a pet animal as defined in claim 20, wherein each of vertical portions of said L-shaped cartridge receiving members has a notch large enough to allow a user's finger to be inserted therethrough.

22. An implement for disposing of dung of a pet animal as defined in claim 19, further including locking means for locking said pusher means with respect to said tubular means to cause said cartridge receiving members to be stationarily located at a position just below said storage means.

23. An implement for disposing of dung of a pet animal as defined in claim 19, further including guide means for guiding said cartridges vertically stacked within said storage means.

24. An implement for disposing of dung of a pet animal as defined in claim 23, wherein each of said cartridge receiving members has a substantially L-shaped body in vertical section, said cartridge receiving members being pivotally connected at said one ends thereof to said pusher means with horizontal portions thereof being faced to each other and with said one ends thereof being spaced apart from each other; wherein each of said casing members includes a substantially box-like body having a substantially U-like configuration in vertical section, said casing members integrally interconnected at edge portions of said one ends thereof through an intermediate section with opened sides thereof being faced to each other, said intermediate section being formed with a fold line extending vertically at substantially the midpoint along a width direction of said intermediate section, said fold line acting as a hinge between said casing members; wherein said cooperating means comprises a hook-like piece and projection combination, said hook-like piece and projection combination comprising hook-like pieces formed at faced edge portions of free ends of said casing members, said hook-like pieces having root portions extending laterally from said faced edge portions of said free ends of said casing members and curved portions curving from said root portions in directions opposite to each other, and projections projecting laterally from faced edge portions of free ends of said cartridge receiving members; wherein said storage means comprises a substantially box-like housing body having upper and lower openings; wherein said tubular body has an opening formed in a predetermined portion of an upper wall thereof, said box-like housing body being fitted at tis lower opening portion in said opening of said tubular body; and wherein said guide means comprises first and second spaced guide plates provided in said housing body, each of said guide plates being separated from both side walls of said housing body and arranged in parallel with said both side walls of said housing body, each of said guide plates having a linear guide slit, each of said cartridges being housed within said housing body with said casing members thereof being closed toward each other, with said intermediate section thereof being folded along said fold line, with said root portions of said hook-like pieces of said closed casing members being received in a guide slit of said first guide plate, with said curved portions of said hook-like pieces being received in a space between said first guide plate and one of said both side walls of said housing body, and with said folded intermediate section being received in a guide slit of said second guide plate in a manner to project at a tip end of said folded intermediate section in a space between said second guide plate and the other of said both side walls of said housing body, said projections of said hook-like piece and projection combination being formed in a manner to allow a space to be provided therebetween when said cartridge receiving members are closed toward each other against an action of said spring means, said space between said projections of said hook-like piece and projection combination being adapted to be aligned with said guide slit of said first guide plate when said cartridge receiving members arrive at a position just below said lower opening of said housing body, a space between the pivotally connecting portions of said cartridge receiving members being adapted to be aligned with said guide slit of said second guide plate, when said cartridge receiving members arrive at said position just below said lower opening of said housing body.

25. An implement for disposing of dung of a pet animal as defined in claim 24, further including cover means for covering said upper opening of said housing body.

26. An implement for disposing of dung of a pet animal as defined in claim 19, wherein said tubular body is provided with a cutter pin hanging from an upper wall of said first end thereof into said longitudinal bore of said tubular body; and wherein each of said cartridges has a tape piece applied across upper surfaces of said casing members thereof to cause said casing members to be closed toward each other.

27. An implement for disposing of dung of a pet animal as defined in claim 19, wherein each of said cartridge receiving members has a substantially L-shaped body in vertical section, said cartridge receiving members being pivotally connected at said one ends thereof to said pusher means with horizontal portions thereof being faced to each other; wherein each of said casing members includes a substantially box-like body having a substantially U-like configuration in vertical section, said casing members being hingedly connected at said one ends thereof to each other with opened sides thereof being faced to each other; and wherein said cooperating means comprises a projection and recess combination, said projection and recess combination including projections formed on an under surface of each of said casing members, each of said projections of said projection and recess combination having a substantially hemispheric shape, and recesses formed in a top surface of a horizontal portion of each of said L-shaped cartridge receiving members, each of said recesses of said projection and recess combination having a substantially hemispheric shape, said recesses of said projection and recess combination corresponding in number to said projections of said combination, said projections of said combination being adapted to be engaged with corresponding recesses of said combination when each of said cartridges drops down onto said cartridge receiving members.

28. An implement for disposing of dung of a pet animal as defined in claim 1, wherein each of said cartridge receiving members has a substantially L-shaped body in vertical section, said cartridge receiving members being pivotally connected at said one ends thereof to said pusher means with horizontal portions thereof being faced to each other; wherein each of said casing members includes a substantially box-like body having a substantially U-like configuration in vertical section, said casing members being hingedly connected at said one ends thereof to each other with opened sides thereof being faced to each other; and wherein said cooperating means comprises a projection and recess combination, said projection and recess combination including projections formed on an under surface of each of said casing members, each of said projections of said projection and recess combination having a substantially hemispheric shape, and recesses formed in a top surface of a horizontal portion of each of said L-shaped cartridge receiving members, each of said recesses of said projection and recess combination having a substantially hemispheric shape, said recesses of said projection and recess combination corresponding in number to said projections of said combination, said projections of said combination being adapted to be engaged with corresponding recesses of said combination when each of said cartridges drops down onto said cartridge receiving members.

* * * * *